United States Patent
Hoch et al.

(10) Patent No.: US 6,399,671 B1
(45) Date of Patent: *Jun. 4, 2002

(54) RUBBER POLYMERS HAVING AN ELEVATED GEL CONTENT AND AN ELEVATED DEGREE OF SWELLING

(75) Inventors: Martin Hoch, Solingen; Hermann Meisenheimer, Köln; Lothar Sesterhenn, Dormagen, all of (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/359,195

(22) Filed: Jul. 22, 1999

(30) Foreign Application Priority Data

Jul. 31, 1998 (DE) .......................................... 198 34 580

(51) Int. Cl.$^7$ .............................. C08J 3/28; C08F 36/06; C08F 36/08; C08F 10/00; C08F 12/00; C08F 20/10

(52) U.S. Cl. ........................ 522/152; 522/153; 522/154; 522/157; 522/158; 522/159; 522/160; 522/161; 522/112; 522/71; 526/328; 526/335; 526/340; 526/341; 526/348.6; 526/348.8

(58) Field of Search ................................. 522/152, 153, 522/154, 157, 158, 159, 160, 161, 112, 71; 526/320, 328, 335, 340, 348.6, 348.8, 341

(56) References Cited

U.S. PATENT DOCUMENTS

| | | | |
|---|---|---|---|
| 3,936,365 A | * | 2/1976 | Suanders et al. |
| 3,988,227 A | | 10/1976 | Eldred .................... 204/159.17 |
| 4,352,765 A | | 10/1982 | Menk et al. ................... 264/22 |
| 4,412,896 A | * | 11/1983 | Lemattre et al. |
| 5,155,197 A | * | 10/1992 | Austin et al. |
| 5,977,271 A | * | 11/1999 | McKay et al. |
| 6,048,912 A | * | 4/2000 | Keller et al. |

FOREIGN PATENT DOCUMENTS

| | | |
|---|---|---|
| EP | 101833 | 3/1984 |
| JP | 60096623 | 5/1985 |

OTHER PUBLICATIONS

Database WPI, Section Ch, Week 197832, Derwent Publications Ltd., London, GB; Class A17, AN 1978–57571A, XP002139508 & JP 53 075278 A (Asahi Dow Ltd), Jul. 4, 1978, Zusammenfassung.

Database WPI, Section Ch, Week 197710, Derwent Publications Ltd., London, GB; Class A32, AN 1977–17414Y, XP002139509 & JP 52 011270 A (Hitachi Cable Ltd), Jan. 28, 1977, Zusammenfassung.

Rubber Tech. Handbook (month unavailable), 1989, pp. 403–406, "Vulcanization by High Energy Radiation".

Encyclopedia of Polymer Science and Engineering, vol. 4, (date unavailable), pp. 66–68, "Compounding".

Encyclopedia of Polymer Science and Engineering, vol. 17, (date unavailable), pp. 666–698 "Vulcanization".

* cited by examiner

*Primary Examiner*—Susan W. Berman
(74) *Attorney, Agent, or Firm*—Joseph C. Gil; Noland J. Cheung; Jennifer R. Seng

(57) ABSTRACT

This invention relates to rubber polymers based on polymerizable monomers and having an elevated gel content together with an elevated degree of swelling, to the production of the stated rubber polymers and to the use thereof for the production of moldings of all kinds.

4 Claims, No Drawings

RUBBER POLYMERS HAVING AN ELEVATED GEL CONTENT AND AN ELEVATED DEGREE OF SWELLING

FIELD OF THE INVENTION

This invention relates to rubber polymers based on polymerizable monomers and having an elevated gel content together with an elevated degree of swelling, to the production of the stated rubber polymers and to the use thereof for the production of moldings of all kinds.

BACKGROUND OF THE INVENTION

The low viscosity of many rubber polymers obtainable according to the prior art, in particular of ethylene/vinyl acetate rubbers or ethylene/acrylate rubbers or acrylate rubbers, gives rise to considerable problems during processing which makes it impossible to use them in many industrial applications. Such problems are, for example, sticking on rollers, inadequate rigidity during profile production or insufficient melt pressure during injection molding.

In the prior art, care has hitherto also been taken during the production of rubber polymers to ensure that the gel content of the resultant rubber polymers was as low as possible in order, by and large, to permit direct processability of the resultant rubber polymers. The gel content of the rubber polymers in such cases was conventionally up to approx. 20 wt. %. The gel content of the polymers was established in such cases in the conventional manner by chemical and/or physical crosslinking, for example by radiation crosslinking or by crosslinking with sulfur or compounds containing sulfur and peroxide compounds.

W. Hofmann accordingly provides a comprehensive description of the radiation crosslinking of elastomers in *Rubber Technology Handbook*, page 403 to 406, Hanser Publishers, Munich, Vienna, New York, 1989. Crosslinking with high energy$\gamma$ radiation is moreover described in *Handbuch für Vulkanisation und Vulkanisationshilfsmitteln*, published by Bayer AG, Leverkusen, 1965, pages 359–363. Unfortunately, polymers treated according to the prior art may frequently be processed in conventional processing apparatus only with difficulty.

SUMMARY OF THE INVENTION

The object of the present invention was to provide rubber polymers which may straightforwardly be processed in conventional rubber processing machinery. This means that no sticking to the roller occurs during production and further processing of rubber compositions, adequate rigidity after shaping is ensured and furthermore the formation of bubbles is, for example, prevented in injection molding.

The present invention provides rubber polymers based on polymerizable monomers and having a gel content of 40 to 80%, relative to the entire quantity of polymer, and a swelling index of 30 to 75, relative to the gel, wherein the gel content and swelling index are established by treatment with $\gamma$ radiation.

Furthermore, the present invention provides the use of the rubber polymers produced according to the present invention for the production of moldings or films of all kinds.

DETAILED DESCRIPTION OF THE INVENTION

The gel content and swelling index of the rubber polymers according to the present invention are determined using the following method:

The sample is placed in methylene chloride, to which 1 g/l of Ionol had been added, such that there were 12.5 g of polymer per liter of solvent. The mixture is shaken for 6 hours at 140° C., then centrifuged for 1 hour at 20,000 rpm, wherein the temperature was still maintained at 140° C. The sol solution was separated and may optionally be further investigated. The gel is first weighed while moist and the quantity of the dry gel obtained after drying to constant weight in a vacuum drying cabinet is determined.

The percentage gel content and the swelling index are calculated using the following formulae:

$$\text{Gel content} = \frac{\text{mass of dry gel}}{\text{total initial weight of sample}} \cdot 100$$

$$\text{Swelling index} = \frac{\text{mass of moist gel}}{\text{mass of dry gel}}$$

The rubber polymers according to the present invention preferably have a gel content of 30 to 80%, particularly preferably of 40 to 70%. The swelling index is preferably 30 to 75, particularly preferably 40 to 60.

The rubber polymers according to the present invention are synthesized from polymerizable monomers which may be used individually or in any desired mixtures with each other. The particular favorable mixture ratio is determined by the intended purpose of the moldings to be produced from the rubber polymers and may readily be determined by appropriate preliminary testing.

Polymerizable monomers which may be considered are ethylenically unsaturated monomers, dienes or trienes. The monomers may optionally be substituted, wherein the substituents may be selected from among halogen, in particular chlorine, bromine and iodine, optionally substituted alkyl groups, in particular methyl, ethyl, n-propyl, iso-propyl, n-butyl, sec.-butyl, iso-butyl, tert.-butyl, n-pentyl, n-hexyl, optionally substituted alkoxy groups, in particular methoxy, ethoxy, n-propoxy, iso-propoxy, n-butoxy, sec.-butoxy, tert.-butoxy, iso-butoxy, optionally substituted aryl groups, in particular phenyl, tolyl, optionally substituted aryloxy groups, in particular phenoxy, p-methylphenoxy, optionally substituted oxycarbonyl groups, in particular acetoxy, propionyloxy, butyryloxy, optionally substituted carboxyl groups or esterified carboxyl groups, in particular methyl carboxylate, ethyl carboxylate, propyl carboxylate, optionally substituted cyano, sulfonate, vinyl ester, vinyl-ether and allyl groups. In the event that the substituents are further substituted, these substituents are preferably substituted with $C_1$–$C_{20}$ groups or halogens.

Particularly preferred monomers are ethylene, propylene, 1-butene, 2-butene, 1-pentene, chloroethylene, styrene, methyl acrylate, methyl methacrylate, ethyl methacrylate, methacrylic acid, vinyl acetate, maleic acid mono- and diester methyl vinyl ether, ethyl vinyl ether, cyanoacrylate, butadiene, isoprene, chloroprene and ethylidenenorbornene.

Very particularly preferred rubber polymers are those synthesized from ethylene and vinyl acetate, from ethylene and the above-stated acrylates and from the pure above-stated acrylates.

In the above-stated polymers, the mixture ratio of the monomers relative to each other is conventionally 0.1%–99.9%, in particular 5%–95%, very particularly preferably 30%–80%.

The gel content and degree of swelling of the rubber polymers according to the invention is established by ionizing radiation. Treatment with $\gamma$ radiation is preferably considered as the ionizing radiation.

In order to be able to establish the gel content and degree of swelling of the rubber polymers according to the invention, the treatment with ionizing γ radiation is performed at a radiation dose of 20 to 140, preferably of 60 to 120, in particular of 70 to 100 kGy (kilogray). Irradiation may be performed using any desired plant suitable for this purpose, for example with a 3.5 MCi $^{60}$Co gamma plant (approx. 1.3 MeV). Apart from Co-60 radiation, radiation from the $^{137}$Cs isotope is also suitable. The applied radiation dose may, for example, be measured using a photometric system from Far West Technology, USA and the film dosimeter supplied by this company. These film dosimeters contain a radiation-sensitive dye and the radiation dose is calculated on completion of the irradiation process from the change in the absorbance of said dye.

These dosimeters are calibrated ex works against an internationally recognized standard.

Treatment with γ radiation may be performed in the conventional manner at temperatures of 0° to 130°, preferably of 10° to 120°, in particular of 20 to 80° C. The most favorable temperature range may readily be determined by appropriate preliminary testing. It is essential that the temperature range is selected such that adequate free radical mobility is ensured.

The rubber polymers according to the present invention are preferably produced by initially polymerizing the monomers used in a conventional manner and then treating the resultant polymers with ionizing radiation.

It is possible in this connection to treat the rubber polymers in the most varied forms, ranging from powders to large bales. It must merely be ensured that the γ radiation used sufficiently penetrates the polymers used.

In order to establish a desired gel content, it has proven particularly advantageous, once the rubber polymers have been irradiated, to homogenize them in suitable apparatus (internal mixers, roll mills or co-kneaders). If the rubber polymer is in finely divided form (for example powder or pellets), a powder mixer may also be used for homogenization. By means of this homogenization, it is possible to obtain a product which is entirely uniform with regard to gel content, irrespective of the shape and size of the irradiated container.

The desired average gel content may, of course, also be established by blending with unirradiated or more or less highly irradiated polymers, i.e. with polymers having different gel contents.

Preferably produced moldings are profiles, tubes, O-rings, seals, sheets, belting, belts, straps and films.

The moldings may be produced by blending the rubber polymers with known quantities of conventional auxiliary substances and processing agents, as described, for example, in Encyclopedia of Polymer Science & Engineering, volume 4, pages 66 et seq. (compounding) and volume 17, pages 666 et seq. (vulcanization). Auxiliary substances and processing agents which may be mentioned are, for example: carbon blacks, mineral fillers, metal oxides, oils, fatty acids, organic peroxides or other crosslinking agents, plasticizers, anti-stick agents, release agents, anti-static agents, flame retardants and anti-oxidants.

It is, of course, furthermore possible to blend the rubber polymers according to the present invention before they are further processed into moldings with further polymers in order to achieve a desired range of properties for the molding which is to be produced. Polymers, which may be mentioned by way of example, are: acrylate rubber (ACM), polybutadiene (BR), polychloroprene (CR), chlorinated and chloro-sulfonated polyethylene (CM, CSM), polyvinyl chloride (PVC), ethylene/propylene rubber (EPM), ethylene/propylene/diene rubber (EPDM), ethylene/vinyl acetate rubber (EVM), polyisoprene (IR, NR), acrylonitrile/butadiene rubber (NBR), hydrogenated acrylonitrile/butadiene rubber (HNBR), styrene/butadiene rubber (SBR), ethylene/methyl (meth)acrylate rubber, in particular ethylene/vinyl acetate rubber, ethylene/methyl (meth)acrylate rubber and acrylate rubber. Ethylene/vinyl acetate rubber is commercially available, for example under the trade name Levapren® from Bayer AG, ethylene/acrylate rubber as VAMAC® from DuPont.

The polymers to be added may be incorporated into the rubber polymers according to the present invention both individually and as a mixture with each other. The mixture ratio of rubber polymers according to the invention to incorporated polymers is in the range from 0.1–99.9:99.9–0.1%. The most favorable mixture ratios may readily be determined by preliminary testing and are determined by the particular intended application of the compositions.

Moldings may be produced from the rubber polymers according to the present invention using units conventional in the rubber processing industry, such as, in particular, extruders, calendars, injection molding machines.

Apart from good processability, the rubber polymers according to the present invention exhibit elevated filler tolerance. The polymers may furthermore be compounded with relatively large quantities of plasticizer, which improves low temperature flexibility.

Another major advantage of the rubber polymers produced according to the present invention is the distinct improvement in free-flowing properties, which is essential for continuous processing. Levapren® in unirradiated form, in particular, remains free-flowing for only a short period due to its elevated tackiness. This disadvantage is eliminated by the irradiation according to the invention.

The following Examples are intended to illustrate the invention.

EXAMPLES

Irradiation of the samples with γ radiation was performed as follows: 25 kg sacks packaged in outer cartons taken from normal production were irradiated in the 3.5 MCi $^{60}$Co gamma plant of the company Beta Gamma Service GmbH & Co. KG at Wiehl.

Levapren® is a copolymer of ethylene and vinyl acetate and a registered trademark of Bayer AG.

Vamac® G is a copolymer of ethylene, methyl acrylate and carboxyl-containing termonomer and a registered trademark of DuPont.

Levapren® 700 HV has a vinyl acetate content of 70%.

Vamac® G has a methyl acrylate content of 55%.

The Mooney values in the Examples were measured on a Monsanto MDR 2000E rheometer, while the gel contents and swelling indices were determined using the above-stated method.

Example 1

Levapren® 700 HV with a Mooney viscosity (ML 1+4) 100° C. of 27 MU and a gel content of below 1% was γ-irradiated with 82 kGy in accordance with the above-stated process. Measurements revealed a Mooney viscosity (ML 1+4) 100° C. of 55 MU, a gel content of 47% and a swelling index of 59 after irradiation.

Example 2 (Comparison)

Levapren® 700 HV with a Mooney viscosity (ML 1+4) 100° C. of 27 MU and a gel content of below 1 % was γ-irradiated with 282 kGy in accordance with the above-stated process. Measurements revealed a Mooney viscosity of above 200 MU (upper limit of measurement range), a gel content of 93% and a swelling index of 9 after irradiation.

Example 3

Vamac® G with a Mooney viscosity (ML 1+4) 100° C. of 16 MU and a gel content of <0.5% was γ-irradiated with 40 kGy in accordance with the above-stated process. Measurements revealed a Mooney viscosity (ML 1+4) 100° C. of 78 MU, a gel content of 44% and a swelling index of 70 after irradiation.

Production of Composition:

A conventional composition formulation was used for this purpose. The constituents of the composition were mixed using conventional methods in a laboratory internal mixer (c.f. for example Encyclopedia of Polymer Science & Engineering, volume 4, pages 66 et seq.).

Rhenogran®, Rhenovin®) and Rhenofit® are registered trademarks of Rhein Chemie Rheinau GmbH.

It was not possible to produce a composition from the product according to Example 2, as it was not processable.

TABLE 1

|  | Uncrosslinked starting material | Crosslinked material from Example 1 |
|---|---|---|
| Levapren ® 700 HV | 100 | — |
| Levapren ® 700 HV, irradiated | — | 100 |
| Rhenogran ® P50 (hydrolysis stabilizer) | 3 | 3 |
| Carbon black N 550[(1)] | 60 | 60 |
| Stearic acid (anti-stick) | 1 | 1 |
| Rhenovin ® DDA-70 (anti-oxidant) | 1.5 | 1.5 |
| Rhenofit ® TAC/S (crosslinking activator) | 3.5 | 3.5 |
| Polydispersion T (VC) D-40 P | 4 | 4 |
| Total: | 173 | 173 |
| Properties of composition |  |  |
| Density (g/cm$^3$) | 1.251 | 1.251 |
| ML 1 + 4/100° C. (MU) | 53 | 81 |
| Vulcanizate properties: |  |  |
| Press vulcanization 20 min/170° C. |  |  |
| *F (MPa) | 19.3 | 20.9 |
| *D (%) | 150 | 170 |
| *S 50 (MPa) | 7.3 | 4.6 |
| *S 100 (MPa) | 15.8 | 13.2 |
| †H 23° C. (Shore A) | 84 | 77 |
| △WW-VDE-0472 (N/mm) | 4.7 | 5.9 |

[(1)]obtainable from Degussa AG
*determined by tensile testing to DIN 52 504 with standard test bar 2
† determined to DIN 53 505
△tear propagation resistance, determined to VDE 0472

Polydispersion T (VC)D-40P is an organic peroxide and is available from Rhein Chemie Rheinau GmbH.

TABLE 2

|  | Uncrosslinked starting material | Crosslinked material from Example 3 |
|---|---|---|
| Vamac ® G | 100 | — |
| Vamac ® G | — | 100 |
| Rhenogran ® P50 (hydrolysis stabilizer) | 3 | 3 |
| Carbon black N 550[(1)] | 40 | 40 |
| Stearic acid (anti-stick) | 1 | 1 |
| Rhenovin ® DDA-70 (anti-oxidant) | 1.5 | 1.5 |
| Rhenofit ® TAC/S (crosslinking activator) | 3.5 | 3.5 |
| Polydispersion T (VC) D-40 P | 4 | 4 |
| Total: | 153 | 153 |
| Properties of composition |  |  |
| Density (Elatest) (g/cm$^3$) | 1.186 | 1.186 |
| ML 1 + 4/100° C. (MU) | 54.2 | 85.6 |
| Vulcanizate properties: |  |  |
| Press vulcanization 20 min/170° C. |  |  |
| *F (MPa) | 15.2 | 15.2 |
| *D (%) | 310 | 280 |
| *S 50 (MPa) | 1.3 | 1.4 |
| *S 100 (MPa) | 3.0 | 3.7 |
| *S 200 (MPa) | 9.7 | 11.0 |
| †H (Shore A) | 48 | 50 |
| Tear propagation (N/mm) resistance△ | 10.4 | 8.9 |

[(1)]obtainable from Degussa AG
*determined by tensile testing to DIN 52 504 with standard test bar 2
†determined to DIN 53 505
△determined to VDE 0472

Table 1 demonstrates the treatment according to the present invention of an EVA rubber; an excessively high radiation dose was selected in Example 2.

Table 1 shows comparably good results of the vulcanizates based on an ethylene/vinyl acetate copolymer. Despite an elevated Mooney value (ML 1+4) 100° C. of the rubber polymer according to the present invention, the vulcanizate properties are virtually unchanged.

Table 2 shows comparably good results of the vulcanizates based on an ethylene/methyl acrylate copolymer. Despite an elevated Mooney value (ML 1+4) 100° C. of the rubber polymer according to the present invention, the vulcanizate properties are virtually unchanged.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber polymers synthesized from polymerizable monomers, wherein said polymerizable monomers are selected from the group consisting of ethylene, propylene, 1-butene, 2-butene, 1-pentene, chloroethylene, styrene, methyl acrylate, methyl methacrylate, ethyl methacrylate, methacrylic acid, vinyl acetate, maleic acid mono- and diester methyl vinyl ether, ethyl vinyl ether, cyanoacrylate, butadiene, isoprene, chloroprene or ethylidenenorbornene, wherein the gel content and swelling index of said rubber polymer is adjusted with γ radiation such that said rubber polymer has a gel content of 40 to 80% with reference to the total mass of said rubber polymer and a swelling index of 30 to 75, relative to the gel.

2. Rubber polymers according to claim 1, wherein the main chain of said rubber polymers is ≧90% saturated.

3. A molding produced from rubber polymers synthesized from polymerizable monomers, wherein said polymerizable monomers are selected from the group consisting of ethylene, propylene, 1-butene, 2-butene, 1-pentene, chloroethylene, styrene, methyl acrylate, methyl methacrylate, ethyl methacrylate, methacrylic acid, vinyl acetate, maleic acid mono- and diester methyl vinyl ether, ethyl vinyl ether, cyanoacrylate, butadiene, isoprene, chloroprene or ethylidenenorbornene, wherein the gel content and swelling index of said rubber polymer is adjusted with γ radiation such that said rubber polymer has a gel content of 40 to 80% with reference to the total mass of said rubber polymer and a swelling index of 30 to 75, relative to the gel.

4. A process wherein a rubber polymer selected from the group consisting of copolymers of ethylene and vinyl acetate, copolymers of ethylene and acrylate monomers and copolymers of acrylate monomers is treated with gamma radiation at a radiation dose in the range from 20 to 140 kGy resulting in the rubber polymer having a gel content of 40 to 80%, relative to the entire quantity of polymer and a swelling index of 30 to 75, relative to the gel.

* * * * *